Feb. 15, 1927.
W. C. GEER
1,617,588
COMPOSITE PRODUCT AND METHOD OF MAKING THE SAME
Filed June 24, 1925
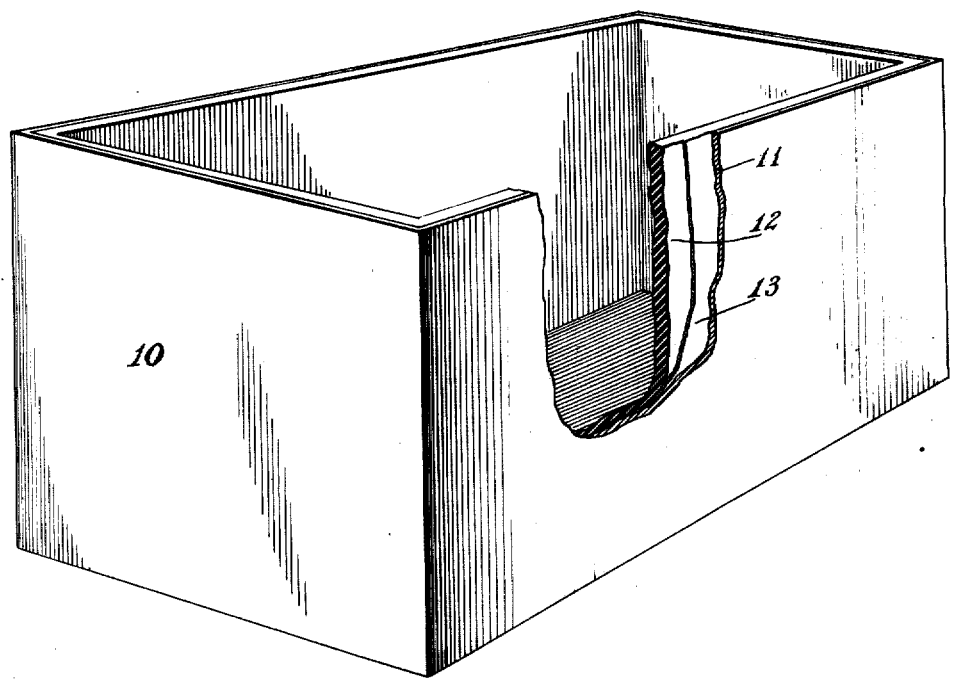
Inventor
William C. Geer
By Pierson, Eakin + Avery,
Attys.

Patented Feb. 15, 1927.

1,617,588

UNITED STATES PATENT OFFICE.

WILLIAM C. GEER, OF AKRON, OHIO, ASSIGNOR TO THE B. F. GOODRICH COMPANY, OF NEW YORK, N. Y., A CORPORATION OF NEW YORK.

COMPOSITE PRODUCT AND METHOD OF MAKING THE SAME.

Application filed June 24, 1925. Serial No. 39,309.

This invention relates to composite products integrally constructed of layers of materials superimposed upon one another and firmly united into an integral construction by an intermediate bonding material. A general object of my invention is to provide strong and durable composite products of the above described character. A further specific object is to provide stronger, more durable and cheaper composite products integrally constructed of vulcanized rubber and metal than have in the past been possible.

Heretofore no entirely satisfactory method has been available for building up composite products with relatively impervious materials, such as metals, glass, rubber, etc. I have found that certain heat-plastic tacky rubber products, more fully hereinafter described, have an exceptionally strong adhesive affinity for metals, particularly ferrous metals, and rubber, and also for paint, glass, concrete, leather, wood, paper, fabrics, and like materials. Further, these heat-plastic products are relatively resistant to attack by acids, with the exception of strong nitric acid, and are highly impervious to liquids and gases. Consequently, these adhesives have been found to be particularly useful as intermediate or bonding layers of composite products constructed in whole or in part of metals or other relatively impervious materials.

Bonding substances of the present invention are preferably prepared by effecting in a mass of rubber a reaction therewith of various rubber isomerizing agents and particularly sulfonic compounds having the grouping $R-SO_2-X$, wherein $R$ represents an organic radical or a hydroxy group and $X$ represents a hydroxy group or chlorine, and including sulfuric acid, organic sulfonic acids, or organic sulfonyl chlorides, or of ingredients capable of producing them in the reaction.

In practice, the following bonding substances have proven to be commercially satisfactory and are here given for the purpose of illustration:

(1) The tough, non-friable, tacky rubber isomer formed by the reaction of an intimate mixture of 7½ parts of p-phenol sulfonic acid and 100 parts of rubber when heated in a compact mass from 4 to 10 hours at 250 to 290° F., the time depending upon how rapidly the batch heats up sufficiently to initiate a vigorous exothermal reaction, the temperature of the material rising to 390—430° F., and the heating being preferably continued for about two hours beyond the peak. Alternatively, I may employ in the place of phenol sulfonic acid any of the following: (a) sulfuric acid, 4 to 5 parts; (b) p-toluene sulfonyl chloride, 9 parts; (c) p-phenol sulfonic acid, 5 parts, and sulfuric acid, 2 parts; (d) or other mixtures of the acids herein noted in the aggregate, 7 to 9 parts.

(2) A similar product formed by the reaction of 4 to 5 parts by weight of concentrated sulfuric acid (sp. gr. 1.84) intimately mixed with 100 parts of rubber and 30 parts of pine tar, when heated in a compact mass from 5 to 7 hours at 268° F., during which heating similar exothermal temperature rises occur as described in preceding paragraph. The quantity of pine tar may be varied from 2 to 50 percent of the rubber contact. Instead of pine tar, other organic softening agents, such as phenol, cresol, xylene, toluene, phthalic anhydride, paraffin, etc., may be employed in a similar manner.

The above products have been found upon anaylsis after the removal of impurities, including residual acid and softening agents, to contain mainly hydrocarbons having the same hydrogen and carbon ratio as rubber, and further to be chemically less unsaturated than rubber. Being colloidal substances, their molecular constitution cannot be readily determined, but they are obviously isomers of rubber, using this term in its broadest sense. They are tough, non-friable solids, soluble in the ordinary rubber solvents, and have specific gravities of the order of .970 to 1.005 and softening temperatures ranging from 140 to 180° F. They flux readily on a hot rubber mill and may be calendered in the same way as crude rubber. They are highly adhesive and bond to ferrous metals with a tenacity many times that of rubber cements. The amount of the reagent employed and the time and temperature of the reaction affect somewhat the physical character of the product. An increment in time and temperature of the reaction or in amount of the reagent used will produce similar products which are not, however, quite as suitable for many purposes of the present invention as the above described products.

The reaction may be carried so far as to produce hard, brittle and grindable products which may replace more or less of the above described products in recipes for particular uses.

For convenience of description in the present application, the bonding substances above described are termed heat-plastic rubber isomers, a designation not wholly inapt for the reason that their main constituent has the same empirical formula as rubber and they possess a much higher degree of plasticity at moderately high temperatures than does rubber, and where this term is employed in the present specification it is intended to include either the purified or impure reaction products herein described, whether or not admixed with other ingredients, and also to include other materials of similar character however produced, namely, materials the main constituent of which consists of a tacky heat-plastic product having the same carbon and hydrogen ratio as rubber and a less chemical unsaturation than rubber.

In the accompanying drawing, the figure is a perspective view of a metal tank provided with a rubber lining adhered to the metal shell in accord with the present invention, parts thereof being broken away to show the structure more clearly.

In constructing composite products in accordance with the present invention, a thin calendered sheet or tissue of a heat-plastic rubber isomer, hereinabove described, may be interposed between layers or bodies of material and the two united by the application of heat or pressure, or both. It is preferable, however, in many instances to apply the heat-plastic rubber in the form of a cement, in which case the heat-plastic should be washed in water to remove any residual acid. A solution or cement composed of 5 to 20 parts by weight of the heat-plastic rubber isomer in 100 parts of solvent, such as benzol, gasoline, etc., is suitable for this surface. Thus, in uniting rubber to iron or steel, I may superpose a thin, calendered ply of my heat-plastic onto a surface of the rubber or the metal, or both, and unite the two by the application of heat and pressure. Alternatively, I may spread a thin film of the solution of the heat-plastic rubber isomer on the faces of the rubber and metal to be united, and permit the solvent to evaporate. In certain cases, it may be preferable to apply a rubber cement to the rubber and a cement of the heat-plastic herein described to the metal. In either case, the rubber and metal are pressed together until the cements set, and the built-up structure is preferably, although not necessarily, subjected to heat to unite more firmly the materials into an integral structure.

In the above illustration, the rubber layer may be vulcanized rubber, vulcanizable rubber, or non-vulcanizable rubber. Where the structure in its finished form is to contain a vulcanized rubber portion, a suitable rubber stock may be previously vulcanized and employed in the manner just described. Other methods of formation, however, are in some instances preferable. Thus, the heat-plastic rubber isomer may be superimposed on a vulcanizable stock, and the stock vulcanized with the heat-plastic layer thereon. The metal sheet may then be applied to the heat-plastic surface and the whole united by heat and pressure. Or, the heat-plastic layer may be interposed between the vulcanizable rubber stock and the metal, and the entire composite body subjected to a curing heat and preferably to pressure at the same time. An extremely strong and durable integral product results.

As a specific example of such a product, I show in the drawing a tank 10 comprising a metal shell 11 and a sheet rubber lining 12 firmly adhered thereto by a layer 13 of a heat-plastic rubber isomer. The rubber lining may be united to the metal of the tank in any of the various ways hereinabove described. In practice, I prefer to employ the following method: cleanse the inner surface of the tank 10, as by sand blasting, and apply two or more coatings of cement, made up of 5 to 20 parts by weight of the heat-plastic rubber isomer dissolved in 100 parts of benzol, or other organic solvent, permitting each coating to dry before applying a successive coating; then apply thereto a coating of curable rubber cement, preferably of the same vulcanization characteristics as the rubber lining, and while the rubber cement is still tacky roll thereon the curable rubber lining 12, care being taken to avoid the entrapping of air between the shell and the lining. The tank 10 is now covered and sealed, and live steam admitted thereinto at a temperature and pressure adequate to vulcanize the rubber lining 12, the temperature and pressure of the steam also acting on the heat-plastic layer 13 to augment its bonding tenacity both to the metal shell 11 and to the rubber lining 12. A strong and durable lining of the tank results.

The above process is applicable to the lining of a wide variety of metal articles, and it is not essential that the articles should be capable of being closed and sealed to hold the vulcanizing stream, since the lined articles can be placed in a vulcanizer and subjected to steam or heated air under vulcanizing temperatures and pressures in a manner commonly practiced in open-steam cures.

Where one of the materials of the composite structure is a fabric or other pervious material, the heat-plastic rubber isomer may be applied to the fabric by frictioning in the same way that rubber is frictioned onto fabric, or by spreading it thereon in a cement or solution. It is entirely practical to apply the heat-plastic rubber isomer to the fabric or other pervious material and to store the fabric thus treated until ready for use. The treated fabric may at a subsequent time be heated, as on a steam table, and applied to other material with pressure. Reenforcement of leather by means of fabric in the manner above described finds a wide use in the industrial arts.

In painting metallic surfaces, such as the bodies of automobiles where a smooth, flexible and non-flaking surface coating is desired, I find that a 2 to 5 per cent solution of the above described heat-plastics forms a superior under-coat which will not flake or crack upon bending of the metal, due to their unusual properties of adhesion to metal and their high degree of flexibility and elasticity. These heat-plastic rubber isomers are also readily miscible with pigments, and paints and varnishes adhere to it with unusual tenacity making it further desirable as a pigmented foundation coat for painted metal bodies.

Other composite structures which require a strong bond for their satisfactory construction may be advantageously formed with the heat-plastic rubber isomers herein defined. Thus, this adhesive has been employed to unite rubber to steel, fabric to leather, leather to rubber, rubber to concrete, metal to glass, etc., with most satisfactory results.

Acid-rubbers, so called, which have heretofore been prepared by treating rubber in solution with sulfuric and other acids, are found to be amorphous, generally crumbly, insoluble or only slightly soluble in the usual rubber solvents, not capable of being readily fluxed on a hot rubber mill, and to have too weak adhesive properties to be of any commercial use as bonding substances for relatively impervious materials. These acid rubbers are, therefore, entirely different compositions lacking the distinctive properties of the above described bonding substances and are not intended to be included herein.

While I have described certain processes for the preparation of my heat-plastic rubber isomers and have set forth a few composite products formed therewith, it is obvious that numerous modifications and variations may be made without departing from the spirit of my invention, and I therefore do not purpose to limit the claims of this specification otherwise than necessitated by the prior art.

I claim:

1. The method of making a composite product of a plurality of materials which comprises superposing bodies of material one on the other, an intermediate body being composed at least in part of a tacky, heat-plastic rubber isomer having a less chemical unsaturation than rubber, and uniting the materials into an integral composite structure by the application of pressure.

2. The method of making a composite product of a plurality of materials which comprises superposing bodies of material one on the other, an intermediate body being composed at least in part of a heat-plastic reaction product of rubber and a sulfonic compound having the grouping $R-SO_2-X$, wherein R represents an inorganic radical or a hydroxy group and X represents a hydroxy group or chlorine, and uniting the bodies by the application of heat and pressure.

3. The method of making a composite product of a plurality of materials which comprises superposing bodies of material one on the other, one of the bodies being of a suitable backing material, another of the bodies composed at least in part of rubber, and a layer intermediate the two aforesaid bodies being composed at least in part of a heat-plastic reaction product of rubber and a sulfonic compound having the grouping $R-SO_3H$, wherein R represents an inorganic radical or a hydroxy group, and uniting the bodies by the application of pressure.

4. The method of making a composite product of a plurality of materials which comprises superposing bodies of material one on the other, one of the bodies being of a ferrous metal, another of the bodies composed at least in part of vulcanized rubber, and a body intermediate the two aforesaid layers being composed at least in part of a heat-plastic reaction product of rubber and a sulfonic compound having the grouping $R-SO_3H$, wherein R represents an inorganic radical or a hydroxy group, and uniting the bodies by the application of heat and pressure.

5. The method of bonding rubber to metal which comprises superposing upon the metal a layer of material composed at least in part of a tacky, heat-plastic rubber isomer having a less chemical unsaturation than rubber, applying thereto a curable rubber composition, subjecting the assemblage to pressure, and vulcanizing the rubber while in pressure contact therewith.

6. The method of bonding rubber to metal which comprises applying to the metal one or more coatings or films of a tacky, heat-plastic bonding substance composed at least in substantial part of a rubber isomer having a less chemical unsaturation than rubber, applying thereto a curable rubber composition, and vulcanizing the rubber while in contact therewith.

7. The method of lining a metallic article which comprises cleansing the metallic surface to which the lining is to be applied, applying one or more coatings of a solution in an organic solvent of a heat plastic bonding substance composed at least in substantial part of a rubber isomer having a less chemical unsaturation than rubber, applying thereto a coating of a curable rubber cement, pressing to the cemented surface a curable rubber composition to line the metal article and subjecting the assembled article to a heated fluid at suitable temperatures to vulcanize the rubber lining in place in contact with the article.

8. A composite body comprising a plurality of distinct bodies integrally and durably coalesced together by a substance composed at least in substantial part of a heat-plastic rubber isomer having a less chemical unsaturation than rubber.

9. A composite body comprising a plurality of distinct bodies integrally and durably coalesced together by a substance composed at least in substantial part of a reaction product of rubber with a sulfonic compound having the grouping R—SO$_2$—X, in which R represents hydrogen or an organic radical and X represents chlorine or a hydroxy group.

10. A composite body comprising a plurality of distinct bodies integrally and durably coalesced together by a substance composed at least in substantial part of a reaction product of rubber with a sulfonic compound having the grouping R—SO$_3$H, in which R represents hydrogen or an organic radical.

11. A composite body comprising a metal and rubber integrally and durably coalesced together by a substance composed at least in substantial part of a thermoplastic rubber isomer having a less chemical unsaturation than rubber.

12. A composite body comprising a metal and rubber integrally and durably coalesced together by a substance composed at least in substantial part of a reaction product of rubber with a sulfonic compound having the grouping R—SO$_2$—X, in which R represents hydrogen or an organic radical and X represents chlorine or a hydroxy group.

13. A composite body comprising a metal and rubber integrally and durably coalesced together by a subtsance composed at least in substantial part of a reaction product of rubber with a sulfonic compound having the grouping R—SO$_3$H, in which R represents hydrogen or an organic radical.

14. A composite body comprising a ferrous metal and vulcanized rubber integrally and durably coalesced together by a substance composed at least in substantial part of a heat-plastic rubber isomer having a less chemical unsaturation than rubber.

15. A composite body comprising a ferrous metal and vulcanized rubber integrally and durably coalesced together by a substance composed at least in substantial part of a reaction product of rubber with a sulfonic compound having the grouping R—SO$_2$—X, in which R represents hydrogen or an organic radical and X represents chlorine or a hydroxy group.

16. A composite body comprising a ferrous metal and vulcanized rubber integrally and durably coalesced together by a substance composed at least in substantial part of a reaction product of rubber with a sulfonic compound having the grouping R—SO$_3$H, in which R represents hydrogen or an organic radical.

17. As a new article of manufacture, a composite material consisting of a plurality of layers of differing materials including a layer comprising in major part a hydrocarbon material having hydrogen and carbon in the same ratio as rubber and a less chemical unsaturation than rubber.

In witness whereof I have hereunto set my hand this 11th day of June, 1925.

WILLIAM C. GEER.

7. The method of lining a metallic article which comprises cleansing the metallic surface to which the lining is to be applied, applying one or more coatings of a solution in an organic solvent of a heat plastic bonding substance composed at least in substantial part of a rubber isomer having a less chemical unsaturation than rubber, applying thereto a coating of a curable rubber cement, pressing to the cemented surface a curable rubber composition to line the metal article and subjecting the assembled article to a heated fluid at suitable temperatures to vulcanize the rubber lining in place in contact with the article.

8. A composite body comprising a plurality of distinct bodies integrally and durably coalesced together by a substance composed at least in substantial part of a heat-plastic rubber isomer having a less chemical unsaturation than rubber.

9. A composite body comprising a plurality of distinct bodies integrally and durably coalesced together by a substance composed at least in substantial part of a reaction product of rubber with a sulfonic compound having the grouping $R-SO_2-X$, in which R represents hydrogen or an organic radical and X represents chlorine or a hydroxy group.

10. A composite body comprising a plurality of distinct bodies integrally and durably coalesced together by a substance composed at least in substantial part of a reaction product of rubber with a sulfonic compound having the grouping $R-SO_3H$, in which R represents hydrogen or an organic radical.

11. A composite body comprising a metal and rubber integrally and durably coalesced together by a substance composed at least in substantial part of a thermoplastic rubber isomer having a less chemical unsaturation than rubber.

12. A composite body comprising a metal and rubber integrally and durably coalesced together by a substance composed at least in substantial part of a reaction product of rubber with a sulfonic compound having the grouping $R-SO_2-X$, in which R represents hydrogen or an organic radical and X represents chlorine or a hydroxy group.

13. A composite body comprising a metal and rubber integrally and durably coalesced together by a subtsance composed at least in substantial part of a reaction product of rubber with a sulfonic compound having the grouping $R-SO_3H$, in which R represents hydrogen or an organic radical.

14. A composite body comprising a ferrous metal and vulcanized rubber integrally and durably coalesced together by a substance composed at least in substantial part of a heat-plastic rubber isomer having a less chemical unsaturation than rubber.

15. A composite body comprising a ferrous metal and vulcanized rubber integrally and durably coalesced together by a substance composed at least in substantial part of a reaction product of rubber with a sulfonic compound having the grouping $R-SO_2-X$, in which R represents hydrogen or an organic radical and X represents chlorine or a hydroxy group.

16. A composite body comprising a ferrous metal and vulcanized rubber integrally and durably coalesced together by a substance composed at least in substantial part of a reaction product of rubber with a sulfonic compound having the grouping $R-SO_3H$, in which R represents hydrogen or an organic radical.

17. As a new article of manufacture, a composite material consisting of a plurality of layers of differing materials including a layer comprising in major part a hydrocarbon material having hydrogen and carbon in the same ratio as rubber and a less chemical unsaturation than rubber.

In witness whereof I have hereunto set my hand this 11th day of June, 1925.

WILLIAM C. GEER.

---

Certificate of Correction.

Patent No. 1,617,588.                   Granted February 15, 1927, to

WILLIAM C. GEER.

It is hereby certified that error appears in the printed specification of the above-numbered patent requiring correction as follows: Page 1, line 78, for the word " contact " read *content;* page 2, line 47, for the word " surface " read *purpose;* and that the said Letters Patent should be read with these corrections therein that the same may conform to the record of the case in the Patent Office.

Signed and sealed this 5th day of April, A. D. 1927.

[SEAL.]

M. J. MOORE,
*Acting Commissioner of Patents.*

Certificate of Correction.

Patent No. 1,617,588.                               Granted February 15, 1927, to

WILLIAM C. GEER.

It is hereby certified that error appears in the printed specification of the above-numbered patent requiring correction as follows: Page 1, line 78, for the word "contact" read *content;* page 2, line 47, for the word "surface" read *purpose;* and that the said Letters Patent should be read with these corrections therein that the same may conform to the record of the case in the Patent Office.

Signed and sealed this 5th day of April, A. D. 1927.

[SEAL.]                                                                  M. J. MOORE,
*Acting Commissioner of Patents.*